United States Patent Office 3,494,728
Patented Feb. 10, 1970

3,494,728
PRODUCTION OF VANADIUM CHLORIDES
Hugh Raymond Letson, Sylvania, Ohio, and Joseph John Ligi, Onsted, Mich., assignors to Stauffer Chemical Company, New York, N.Y., a corporation of Delaware
No Drawing. Filed Sept. 26, 1966, Ser. No. 581,744
Int. Cl. C22b 59/00
U.S. Cl. 23—20   7 Claims

ABSTRACT OF THE DISCLOSURE

Vanadium tetrachloride is prepared from the reaction of vanadium oxytrichloride with trichloromethyl aromatic compounds in the presence of elemental chlorine at a temperature of from 150° to 170° C.

---

This invention relates to the production of vanadium tri- and tetrachlorides by reaction of vanadium oxytrichloride with aromatic compounds comprising trichloromethyl groups. The vanadium oxytrichloride may be conveniently and expeditiously derived through the reaction of vanadium pentoxide with the trichloromethyl-aromatic compound; indeed, the latter reaction may be applied as the first step of the process herein.

The reaction of vanadium pentoxide with trichloromethyl-aromatic compounds, particularly benzotrichloride, has been heretofore proposed as a route for the preparation of vanadium oxytrichloride and vanadium tetrachloride and for the preparation of the acid chlorides corresponding to the trichloromethyl-aromatic compounds employed. However, the prior art fails to teach any scheme whereby the reaction may be controlled to the end of favoring the production of the tetrachloride over the oxychloride or vice versa.

The principal object of the present invention is to provide a process providing such a control.

Another object is to provide a process whereby the reaction may be applied to the production of vanadium trichloride.

Other objects will be apparent from the subsequent description.

The interest of the applicants herein resides particularly in the trichloride and tetrachloride, as opposed to the oxychloride and acid chloride. Both the trichloride and tetrachloride are highly useful as catalysts in the polymerization of olefins, e.g. propylene.

The present invention is based largely on the finding that when vanadium pentoxide is admixed with a trichloromethyl-aromatic compound, as benzotrichloride, and the mixture is heated, the resulting reaction proceeds essentially stepwise in accordance with the following equations:

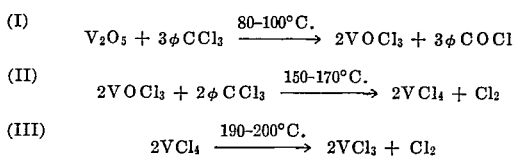

(I) $$V_2O_5 + 3\phi CCl_3 \xrightarrow{80-100°C.} 2VOCl_3 + 3\phi COCl$$

(II) $$2VOCl_3 + 2\phi CCl_3 \xrightarrow{150-170°C.} 2VCl_4 + Cl_2$$

(III) $$2VCl_4 \xrightarrow{190-200°C.} 2VCl_3 + Cl_2$$

Reaction I is exothermic and carries itself once a temperature of 90° C. is reached. Reactions II and III, although exothermic, require the application of heat because of the heat loss occasioned by the evolution of the chlorine.

If vanadium tetrachloride is the desired product, the temperature must be held within the limits indicated by II and the tetrachloride must be continuously removed as the reaction progresses.

In any of the reactions, the temperature may be conveniently controlled by reducing the pressure on the reaction mixture.

The temperatures recited are those optimum for the occurrence of the reactions, but there is considerable over-lapping, which is to say that some de-chlorination to $VCl_3$ is prone to occur during II. It is for this reason that the $VCl_4$, when the desired product, must be continuously removed from the reaction vessel as it is formed.

Some vanadium trichloride may be produced even at the temperatures of I. When such compound is the desired product, it is desirable to provide for the removal of the by-product chlorine from the reaction vessel. This can be accomplished, for example, through the use of an inert gas such as nitrogen. It is not necessary that the reaction be carried out at the temperature of III for maximum $VCl_3$ conversion, since reflux temperatures are sufficient provided the reaction is extended for a sufficient period. For a maximum production rate, however, the temperature employed should be within the recited range.

The invention, of course, may be practiced starting with vanadium oxytrichloride however produced. It is acknowledged that reaction I per se is not a new discovery, but it does not appear that it has been recognized before that such reaction proceeds to best advantage at temperatures below 100° C.

It has been determined that improved yields of the tetrachloride, when the same is the desired product, are obtained if the reaction between the vanadium oxytrichloride and the trichloromethyl-aromatic compound is carried out in the presence of elemental chlorine and a fully-chlorinated hydrocarbon, preferably a fully-chlorinated diolefin, e.g. hexachlorobutadiene, cyclohexachloropentadiene, and the like. Apparently the chlorinated hydrocarbon serves to maintain the chlorine in solution to some extent and thus tends to stabilize the tetrachloride.

The chlorinated hydrocarbon is normally added to the reaction vessel before heat-up. The amount used is not critical. However, as a matter of practice the chlorinated hydrocarbon is usually employed in a quantity equivalent to about 5–15 percent of the weight of the principal reactants.

Irrespective of whether vanadium trichloride or vanadium tetrachloride is the desired product, it has been found that advantage attaches to the use of the trichloromethyl-aromatic compound in excess. A 10 percent excess (over the stoichiometrical amount) appears adequate; little difference in results being obtained when the amount is increased, even to 50 percent over theoretical.

The invention is further illustrated by the following examples which are not to be taken as in any way limitative thereof.

EXAMPLE I

A 1-liter pot was equipped with a stirrer and mantel and a fixture allowing for chlorine flow to the pot. To take the distillate from the pot there was provided a 12″ x 1″ column packed with 6 mm. Raschig rings. A Claisen head equipped with a magnetic splitter was employed.

To the pot was added 0.5 mole vanadium pentoxide and 2.7 moles benzotrichloride. Upon the application of heat (90° C.) a self-sustaining reaction occurred. Through control of the pressure, the temperature of the reaction mixture was not allowed to exceed 110° C. Upon completion of the reaction the principal product was found to be vanadium oxytrichloride (88.5 percent on the weight of the charge). The oxy-chloride was distilled from the pot leaving benzoyl chloride and 3.4 percent on the weight of the charge of $VCl_3$ as residue.

EXAMPLE II

The experiment of Example I was repeated at a temperature of 160° C. Results were as follows:

Charge at 160° C.:  Percent
- VCl₄ -------------------------------- 42.0
- VOCl₃ ------------------------------- 36.9
- VCl₃ (solids) ----------------------- 7.8

The run was carried out using a reflux ratio of 1:9.

The VCl₄ and VOCl₃ obtained as the distillate from the pot were separated by fractionation.

EXAMPLE III

The experiment was repeated under total reflux with nitrogen rather than chlorine being admitted through the gas inlet. The nitrogen was applied to remove chlorine from the pot. As a consequence, the principal product was VCl₃. It was found that the decomposition of VCl₄ to solid VCl₃ becomes complete at 190°–200° C. The VCl₃ as so produced can be removed from the pot, after the liquid products have been removed, by inert gas transport opening to a cyclone separator system.

EXAMPLE IV

The experiment was repeated with Cl₂ being introduced through the gas inlet, 10 percent by weight on the reactants of hexachlorobutadiene being added to the pot along with the V₂O₅ and the benzotrichloride. The results were as follows:

|  | Percent of charge |  |  |
|---|---|---|---|
|  | VCl₄ | VOCl₃ | VCl₃ |
| 110° C | 1 | 91 | None detectable. |
| 160° C | 55 | 14 | Do. |

These runs were carried out at a refluv ratio of 9:1.

EXAMPLE V

Cyclohexachloropentadiene was used in lieu of the hexachlorobutadiene. The results were essentially the same.

EXAMPLE VI

VOCl₃ was used as a starting material according to the reaction:

Chlorine was admitted to the pot during the reaction and the starting mixture included 10 percent on the weight of the benzotrichloride of hexachlorobutadiene. The reaction mixture was held at reflux for 2 hours whereafter analysis showed the following:

Percent
- VCl₄ -------------------------------- 54.9
- VOCl₃ ------------------------------- 27.5
- VCl₃ -------------------------------- 11.5

EXAMPLE VII

The experiment of Example VI was repeated, the time period being roughly doubled. Results:

Percent
- VCl₄ -------------------------------- 4.61
- VOCl₃ ------------------------------- 21.0
- VCl₃ -------------------------------- 65

This run taken with the showing of example VI conclusively demonstrates that in the reaction being dealt with, the VCl₃ is derived through de-chlorination of the VCl₄ and emphasizes the desirability of continuous removal of VCl₄ from the reaction vessel when the same is the desired product. In the latter case, the reflux ratio employed necessarily represents a compromise between adequate residence for maximum conversion of the VOCl₃ to VCl₄ and prompt removal of the product VCl₄ to avoid its de-chlorination.

The invention claimed is:

1. Method of producing vanadium tetrachloride comprising reacting vanadium oxytrichloride and a trichloromethyl-monocyclic aromatic compound at a temperature of from about 150° to 170° C. while elemental chlorine is continuously introduced into the reaction mixture as the reaction proceeds and the tetrachloride product is continuously removed as formed.

2. Method according to claim 1 where the trichloromethyl-monocyclic aromatic compound in benzotrichloride.

3. Method according to claim 1 where the vanadium oxytrichloride reactant is derived by reaction of vanadium pentoxide and the trichloromethyl-monocyclic aromatic compound at a temperature not substantially exceeding 110° C.

4. The method according to claim 1 wherein a fully-chlorinated hydrocarbon is included in the reaction mixture.

5. Method according to claim 4 where the fully-chlorinated hydrocarbon is a fully-chlorinated diolefin.

6. Method according to claim 5 where the fully-chlorinated diolefin is hexachlorobutadiene.

7. Method according to claim 5 where the fully-chlorinated diolefin is cyclohexachloropentadiene.

References Cited

UNITED STATES PATENTS

| 2,946,668 | 7/1960 | Richelsen | 23—87 X |
| 3,128,150 | 4/1964 | Brothers | 23—87 |
| 3,278,257 | 10/1966 | Tyree et al. | 23—87 X |
| 3,384,448 | 5/1968 | Mason et al. | 23—20 |

FOREIGN PATENTS 897,187   5/1962   Great Britain.

OTHER REFERENCES

Davies et al., "Chemical Abstracts," vol. 27, 1933, p. 494.

Mellor, "Comprehensive Treatise on Inorganic and Theoretical Chemistry," vol. 9, 1929, Longmans, Green & Co., New York, p. 803.

HERBERT T. CARTER, Primary Examiner

U.S. Cl. X.R.

23—22, 87